United States Patent
Browne et al.

(10) Patent No.: US 8,601,447 B2
(45) Date of Patent: Dec. 3, 2013

(54) OPEN CONTROLS

(75) Inventors: Dean Neal Browne, San Francisco, CA (US); Andrew Todd Lorek, San Francisco, CA (US); Stephan Dennis Morais, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1554 days.

(21) Appl. No.: 11/863,811

(22) Filed: Sep. 28, 2007

(65) Prior Publication Data

US 2008/0168430 A1    Jul. 10, 2008

Related U.S. Application Data

(60) Provisional application No. 60/884,286, filed on Jan. 10, 2007.

(51) Int. Cl.
*G06F 9/45* (2006.01)
*G06F 9/44* (2006.01)

(52) U.S. Cl.
USPC ............................. 717/137; 717/118

(58) Field of Classification Search
USPC .......................... 717/114–119, 137
See application file for complete search history.

(56) References Cited

U.S. PATENT DOCUMENTS

2003/0226136 A1\* 12/2003 Calahan ................ 717/162
2006/0212454 A1\* 9/2006 Behl et al. ............. 707/10

OTHER PUBLICATIONS

Microsoft Corporation, "Moving Java Applications to .NET", May 2005, http://msdn.microsoft.com/en-us/library/ms973842.aspx, 11 pages.*
Michael Klaene, "Java Server Faces and ASP.NET—A Side by Side Look", Dec. 22, 2005, http://www.developer.com/net/asp/article.php/3572721/JavaServer-Faces-and-ASPNET---A-Side-by-Side-Look.htm, 6 pages.*

\* cited by examiner

*Primary Examiner* — Wei Zhen
*Assistant Examiner* — Lanny Ung
(74) *Attorney, Agent, or Firm* — Kilpatrick Townsend & Stockton LLP

(57) ABSTRACT

One embodiment of the present invention is a method of converting a user interface. A control based class can be extended to produce a Java Server Face. The Java Server Face can be converted to create an ASP.NET user interface.

13 Claims, 2 Drawing Sheets

OPEN CONTROLS

CLAIM OF PRIORITY

This application claims priority to U.S. Provisional Application No. 60/884,286 entitled "Open Controls" filed Jan. 10, 2007, by Dean Neal Browne, et al., and is hereby incorporated by reference.

REFERENCE TO APPENDIX

A Computer Program Listing Appendix is being filed as part of this application. The present application incorporates by reference for all purposes the entire contents of Computer Program Listing Appendix.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

JAVA Server Faces (JSFs) and ASP. Net interfaces are flexible interfaces. Both JAVA Service Faces and ASP.NET provide frameworks for writing reusable user-interface controls for use in web applications. These controls render themselves as HTML, CSS, and JAVA Script so that they may be displayed in a web page and interact with the back-end of a server application. One difficulty is that these user interfaces are typically not compatible.

DETAILED DESCRIPTION

One embodiment of the present invention concerns ways to convert between JSF and ASP.Net user interfaces.

Figure 1:
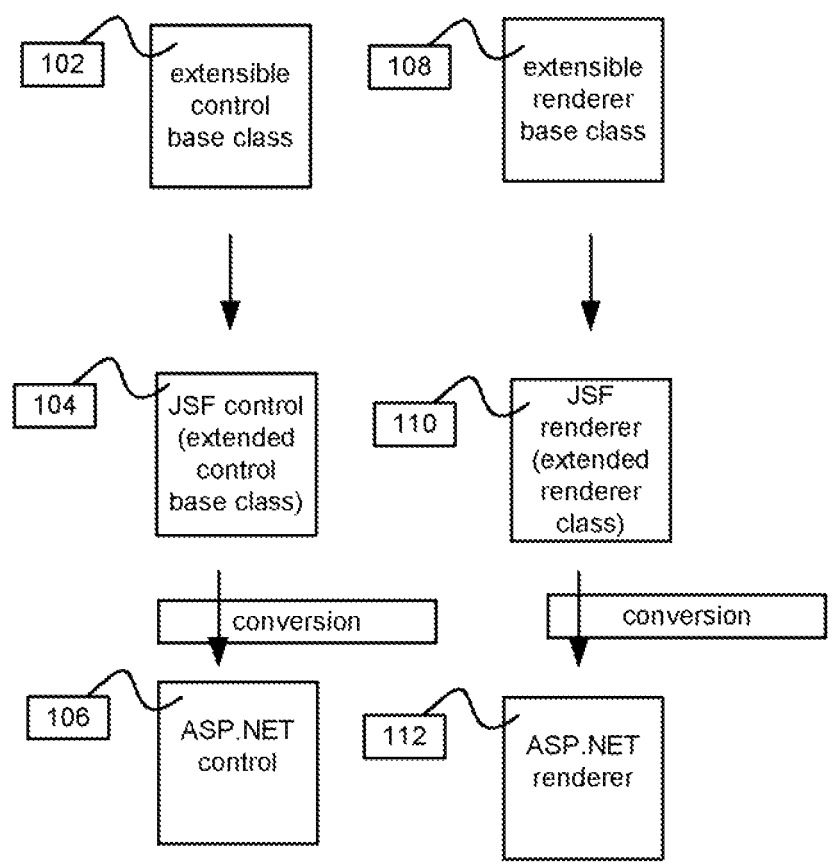
FIG. 1 illustrates a system of one embodiment for converting between JSF and ASP.Net user interfaces.

As shown in FIG. 1, in one embodiment, a control base class is extended to produce a JAVA Server Face 104. The JAVA Server Face 104 can then converted to create an ASP.NET user interface 106.

The use of an extensible control class base makes it easier to ensure that the JSF is easily convertible.

The control base class 102 can include method signatures that are convertible to an ASP.NET version of the control base class. An abstracted rendered class 108 can be used to provide rendering functionality in both JSF and ASP.NET. The abstracted renderer class 108 can be extended to produce a specific JSF renderer 110. The specific JSF renderer can be convertible to an ASP.NET renderer 112. A page command control for page navigation can be convertible between JSP and ASP.NET. An Abstract input control can be converted from JSF to ASP.NET.

Figure 2:
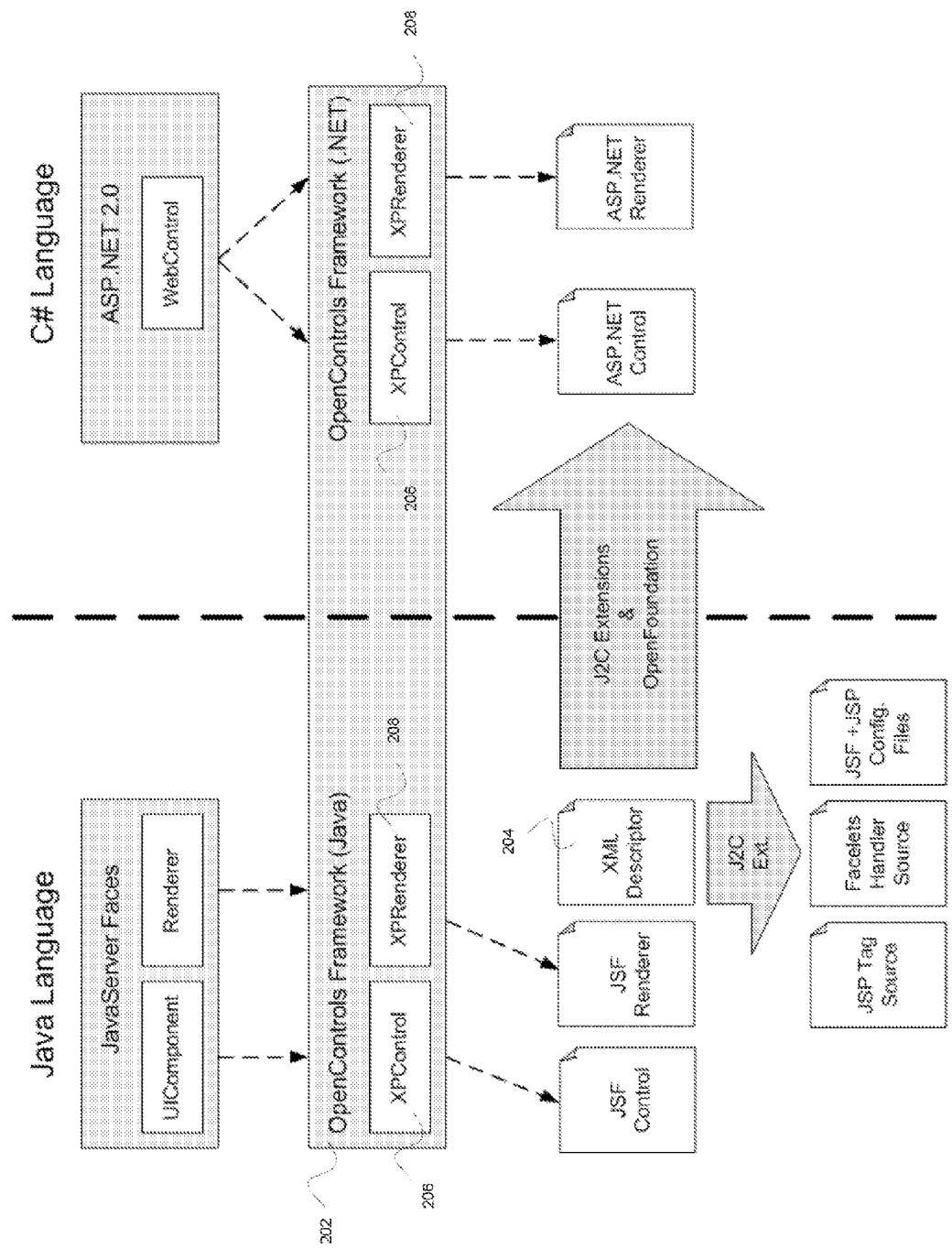
FIG. 2 illustrates details of one type of conversion between JSF and ASP.Net.

FIG. 2 shows on embodiment of a system of the present invention. An OpenControls Framework 102 can provide an abstraction layer on top of the functionality of both JSF and ASP.Net platforms, allowing controls that are written as JAVA-language JavaServer Faces controls to be "jumped", that is converted, into C#-language ASP.NET controls. In one embodiment, controls can be converted from JSF to ASP.NET using the OpenControls J2C Extensions, the OpenFoundation library, and an XML file 204 containing descriptive metadata about the control. In addition, configuration files and other sources files needed to display these controls in either platform can also generate.

The following is a more detailed description of one non-limiting embodiment of the present invention.

An OpenControls framework 202 can be used to create jumpable UI controls.

Control Abstraction can provide a jumpable base class for JSF and .NET, called XPControl 206, as well as jumpable wrapper class for other native UIComponents and WebControls. It can include jumpable base classes that replicate native base classes such as UICommandComponents and UIEditiableComponent [UIEditableComponent??].

Renderer Abstraction, in the case of JSF, can provide a jumpable base class for JSF Renderers called XPRenderer 208 and provides a jumpable wrapper class for all other native Renderers. In this case of .NET, it can provide a Renderer registration infrastructure as well as jumpable XPRenderer and native wrapper classes.

XPCommand control can be an abstract control used to perform page navigation, typically a button or link control. It can be a jumpable version of the JSF UICommand control.

XPInput Control can be an abstract control used to input data from a form post. XPInput can provide support for form data validation and is jumpable version of the JSF UIInput control.

XPDataSource and SPDataBound Controls. XPDatasource can be a jumpable version of ASP.NET 2.—DataSource controls and represent a non-displayed link to some external data source. XPDataBound controls can be accessed this external data to render themselves.

$3^{rd}$ Party Control and Renderer Wrappers can describe an abstraction layer allowing $3^{rd}$ party controls and renderers to be referenced by jumpable OpenControls.

Web application frameworks can make the task of creating remote web applications simpler. On the JAVA side, the latest iteration is JavaServer Faces, a component framework designed to mimic the windowing toolkits used to develop desktop applications. JSF follows a long line of other JAVA web application frameworks based on the JAVA Servlets API, but adds several new features such as a client-to-server event model and a UI component development framework. On the .NET side, Microsoft has recently release their 2.0 version of the popular ASP.NET web application framework. ASP.NET provides an event model and component framework similar to JavaServer Faces.

A system can be used for writing controls in one of the frameworks, and "jumping" the control source and configuration to the other framework. The OpenControls project can provide a set of classes in both the JSF and ASP.NET frameworks that will extend the base UI control and rendering classes in both frameworks and will allow the jumping of a control from JSF to ASP.NET. An XPControl base class, with abstracted control functionality and jumpable method signatures, can serve as the basis for writing jumpable UI controls.

UI controls in JSF and ASP.NET have a variety of common features that can be abstracted in such a way that they can be jumped. OpenControls can define an XPControl base class that can facilitate the abstraction of these features:

Unique ID Generation—All controls can uniquely identify themselves by ID, both on the server and the client.

Tag-Defined Properties—When declared in an XML tag in a JSP or ASP, XPControl can translate a string attribute value into a property data type (e.g. int, boolean, Date, etc.)

Tag-Defined Event Handlers—When declared in an XML tag in a JSP or ASP, XPControl can translate a string attribute into a JSF MethodBinding or an ASP.NET method Delegate.

JavaServer Faces uses its getClientId( ) method as both a mechanism for uniquely identifying the control on the server as well as the client-side HTML elements that make up the control. In general, ASP.NET has a better system for managing control IDs on both the client and the server in that it provides a clean separation between the server-side ID and the client-side ID. In addition, the FacesContext argument to the UIComponent.getClientId method is not jumpable, given that FacesContext is a JSF-specific class. Therefore, Open-Controls can adopt the ASP.NET system for identifying controls on the server and the client and can change the UIComponent API to match ASP.NET's WebControl ID system. For the XPControl base class, the breakdown of IDs can be:

| JavaServer Faces | ASP.NET | Description |
|---|---|---|
| XPControl.getId( ) | XPControl.ID | The id of the UI control on the server, unique within the scope of a naming container |
| XPControl.getUniqueId( ) | XPControl.UniqueID | The id of the UI control on the server, unique within the scope of the entire page. |
| XPControl.getClientId( ) | WebControl.ClientID | The id of the control's principle HTML element on the browser page |

Control State Management—XPControl can work with the native state management in the JSF and ASP.NET platforms to preserve the state of a control between HTTP requests. This can be transparent to control developers.

Event Broadcast—XPControl can work with existing event types broadcast in JSF and ASP.NET Utility Functions—Utility functions that are shared by the two control base classes.

In JSF, XPControl can extend javax.faces.component.UIComponent, the base class for all JSF components, and provide method signatures that can be easily jumped to the ASP.NET version of XPControl. This C# class can extend System.Web.UI.WebControls.WebControl, the base class for all UI controls in ASP.NET.

Both frameworks have a notion of server-side and client-side IDs for uniquely identifying controls on the server and the browser page. In addition, both have a concept of a "naming container", which allows controls to be uniquely identified within the child component scope of the naming container. The breakdown of id access methods can be:

This system has a number of advantages. First, the client ID generated natively by JSF usually contains a ':' character that prevents the HTML elements that make up that control from being accessed by the '.' operator in JavaScript. The XPControl.getClientId method can replace this character with a '_' character to overcome this difficulty, e.g.:

Invalid:
document.forms.myform.mycontainer:mycontrol.value='foo';

Valid:
document.forms.myform.myc ontainer_mycontrol.value='foo';

In addition, in a portlet environment the XPControl.getClientId method can be made to return an id that is unique to the portal page, by appending the current portlet ID that the control is being used in. This can eliminate JavaScript naming conflicts between controls if, for example, the same portlet appears twice on one portal page.

The XPControl.getUniqueId method can be used to post data from form input controls such as textfields and check-

| JavaServer Faces | ASP.NET | Description |
|---|---|---|
| UIComponent.getId( ) | WebControl.ID | The id of the UI control on the server, unique within the scope of a naming container |
| UIComponent.getClientId(FacesContext) | WebControl.UniqueID | The id of the UI control on the server, unique within the scope of the entire page. |
| UIComponent.getClientId(FacesContext) | WebControl.ClientID | The id of the control's principle HTML element on the browser page | boxes so that it can be properly interpreted by the server side form post decoding methods in the controls. In addition, this method will be used to send IDs in AJAX requests so that the server-side AJAX request handling functionality will know how to route the AJAX request to the appropriate IXPAjax-Control implementor.

The XPControl.getId method can be rarely used in control development, and serve more as the property value set when the user places an "id" attribute in the XML tag representing the UI control. It is then combined with the naming container ID to create the unique ID used by the control. If this attribute is not set, both frameworks will automatically generate an ID for the control. However, due to testing considerations, JSF XPControl subclasses can set an ID on each control used in a JSP page. This restriction is so that automated testing suites like Selenium can get a handle on HTML elements rendered to the page, and is enforced by the Tag Library Descriptor XML file generated by the OpenControls J2C engine.

Both frameworks allow XML tag attributes to be mapped to UI control properties on the server. In the case of JSF, a property is defined as a set of getter/setter methods that get and set a serializable Object value on the control. For example, a textfield control may have the following methods:

```
public String getText( ) { return myText; }
public void setText(String newText) { myText = newText; }
```

When writing the control's XML tag representation, the property would be set as follows:
<oc:TextField text="foobar"/>
And the JSF framework would automatically call setText ("foobar") on the TextField control represented by this XML when loading the control. Likewise in ASP.NET, control properties are declared using the C# property syntax, so that the same XML tag as above would require a control property declaration of the form:

```
public string Text
{
    get
    {
        return myText;
    }
    set
    {
        myText = value;
    }
}
```

One difference in control development practices between the two frameworks is that the data set on a control property in ASP.NET is typically stored in a ViewState hash map, accessed via a String key for that property, whereas JSF controls can store their property data in any form, usually a member field of the control class.

OpenControls can harmonize property data storage by using the XPControl.getPropertyValue and XPControl.setPropertyValue methods. In ASP.NET, this method will simply wrap access to the ViewState map. In JSF, rather than storing property values in control fields, the property values will be stored in a HashMap field that will act similarly to the ASP.NET ViewState.

Because handling of primitive data values differs between C# and JAVA, a sub-collection of property value getters and setters can exist for setting primitive property values to an XPControl. These methods can be:
getShortPropertyValue, setShortPropertyValue
getIntPropertyValue, setIntPropertyValue
getFloatPropertyValue, setFloatPropertyValue
getDoublePropertyValue, setFloatPropertyValue
getCharPropertyValue, setCharPropertyValue
getBooleanPropertyValue, setBooleanPropertyValue Using the TextField control example above, the JSF methods can then be transformed to:

```
public String getText( )
{
    return (String) getPropertyValue("Text");
}
public void setText(String newText)
{
    setPropertyValue("Text", newText);
}
```

The jumped C# source for the control property in ASP.NET can then appear as:

```
public string Text
{
    get
    {
        return (string) GetPropertyValue("Text");
    }
    set
    {
        setPropertyValue("Text", value);
    }
}
```

The ASP.NET WebControl class contains a number of built-in properties that can be accounted for when developing jumpable controls. These properties can be represented in the JSF version of XPControl to ensure that they are accessible in both controls. The built-in properties can be:
boolean Enabled
Unit Height
Unit Width
Color BackColor
Color ForeColor
String ToolTip
String CssClass
Unit BorderWidth
Color BorderColor
BorderStyle BorderStyle While String and Boolean properties can be natively handled by JSF controls, properties of type Color, Unit, and BorderStyle are ASP.NET specific properties with no JSF analogue. OpenControls can implement these analogues, creating jumpable JAVA versions of the Color, Unit, and BorderStyle classes.

Other properties are built into JSF UIComponents but not ASP.NET WebControls. These properties are:
boolean Rendered
String RendererType In the case of the Rendered property, this property can be directly analogous to the WebControl.Visible property, and can be translated as such when the OpenControl is jumped. RendererType is a property unique to JSF and can be added to the ASP.NET version of XPControl to support renderer registration, described in Renderer Abstraction section of this DSD.

XPControl can support any control property of a type that is jumpable between the two web application frameworks. Control developers can create new property types, provided they are both jumpable and serializable. The list of property types currently supported by OpenControls include:

String
Object
language primitives (short, int, float, double, char, boolean)
IXPDictionary
IXPList
String[ ]
XPLocale
XPDateTime
Color
Unit
BorderStyle New property types can be added to the list provided they are jumped along with the controls that use them.

Since the tags used to declare a control are intrinsically Strings, mechanisms can exist to convert String property values declared in the XML tags into the Object representation of the property value. In JSF, this conversion can be performed in the base tag class generated by the OpenControls J2C engine. ASP.NET has a concept of property type converters that must be set as attributes to the property declarations. OpenControls can include custom converters to handle all the data types mentioned above.

When setting a String attribute value for a property of type IXPDictionary, the syntax of the string can follow the URL parameter encoding syntax, e.g. "key1:value1&key2: value2&key3:value3;". This can limit IXPDictionaries to being String only collections.

When setting a String attribute value for a property of type IXPList or String[ ] array, the syntax of the string can follow a comma-delimited list declaration, e.g. "value1,value2, value3,value4". This again limits lists to being collections of Strings.

XPDateTime properties can be set by any string that is supported by the XPDateTimeFormat class, and XPLocale properties can be set by the syntax "[language code]_[country code]".

Both frameworks allow control properties to be "bound" to an external data source. In the case of JSF, this data source is usually a getter/setter method in a JavaBean object, residing in the request, session, or application scope. The actual binding is represented by a ValueBinding instance that points to the JavaBean getter/setter combo. In ASP.NET, this external data source is typically a property or method on the code-behind Page implementation, and is bound via a special ASP page syntax and the invocation of a control's DataBind method. In either case, OpenControls can seamlessly allow these bindings to be accessed using the getPropertyValue method. If a data binding exists, its value can be returned by getPropertyValue, otherwise the local value stored in the ViewState or JSF property Map will be returned.

Usually, data bound properties are "read-only", and user input will not change the value of the property on the external data source. However, for those instances where a new property value needs to be set, XPControl can provide the updateModel method. This method can be automatically called by the JSF application during the "Update Model Values" phase of the JSF lifecycle. Within the method, control developers can push control values to the external datasource by calling updatePropertyValue. Some XPControl subclasses, like XPInput, can do this automatically for the control developer.

The ASP.NET framework can automatically update bound data for the control developer, and as such the updateModel method need never be called in the normal operation of a jumped XPControl subclass.

Both frameworks have a server-side event model that allows client-side actions, such as the clicking of a button, to result in events being fired from the server-side control representing that button. Before AJAX, this client-to-server event transfer was mediated by posting the form in which the control was embedded. With AJAX, controls have the ability to immediately fire server-side vents immediately after the event occurs on the client.

In JSF, handlers for these server-side events are implemented as MethodBinding properties. A MethodBinding is a pointer to a JavaBean method that can be dynamically invoked by the control. Control properties can take MethodBindings as property values, such that a Button control can have a "Action" property that will invoke the MethodBinding, and by extension the JavaBean method pointed to by the MethodBinding, when the button is clicked in the browser. MethodBindings must be declared with a specific method signature, and only one MethodBinding can be set to a property at a time.

ASP.NET differs from JSF in that the event handlers it uses to process control events are a built-in part of the C# language. Method Delegates are used by WebControls to handle server-side events. A Delegate is declared by using the delegate and event keywords on a WebControl property. Like JSF MethodBindings, Delegates act as pointers to non-control methods, typically contained in a code-behind Page implementation, and these methods must follow a specific method signature defined when the Deletage is declared. Unlike MethodBindings, any number of Delegates can be assigned to a single event property on a control.

As with standard properties, OpenControls can provide abstraction methods for getting and setting event handlers. In JavaServer Faces, the XPControl.getEventMethod and XPControl.setEventMethod functions can allow event handlers to be registered and stored on a control. In our TextField example, the event handler declarations might look like:

```
public MethodBinding getAction( )
{
    return getEventMethod("Action");
}
public void setAction(MethodBinding mb)
{
    setEventMethod("Action", mb);
}
```

In ASP.NET, the method syntax changes due to the fact that multiple Delegates can be registered on a single property. In addition, the OpenControls J2C engine can generate the Delegate declaration for an event property. In this case, the getEventMethod and setEventMethod functions can be transformed into AddEventMethod and RemoveEventMethod.

```
public Delegate void ActionHandler(TextField, string value);
public event ActionHandler Action
{
    add
    {
        AddEventMethod("Action", value);
    }
    remove
```

-continued

```
    {
        RemoveEventMethod("Action", value);
    }
}
```

The method signature for a MethodBinding or Delegate can be specified in the control library XML file. Provided it is specified correctly, control developers will not have to worry about properly transforming from MethodBinding properties to C# Delegate events.

When rendering a control, it is often useful to know if an event handler has been registered for a particular control property. While this is simple for JSF (e.g. getAction( )!=null), it is more of a tricky prospect with C# Delegates. This has to do with the way WebControls store Delegate instances in an Events collection. Instead, XPControl can have a hasEventMethod function that will allow developers to test for the presence of one or more event handlers registered to a property:

```
if(hasEventHandler("Action"))
{
    //render event generation HTML
}
```

Since the syntax for invoking an event handling MethodBinding or Delegate differs between the two platforms, XPControl can provide an invokeEventMethod function to abstract event handler invocation.

```
Object[ ] args = { this, "foobar" };
invokeEventMethod("Action", args);
```

An essential feature of any server-side UI component framework is the ability to preserve control state between HTTP requests. HTTP being a stateless protocol, this can require control data to either be saved on the server session, or encoded in some way into the client-side HTML and processed when the next request is made.

JSF allows for both types of state management, whereas ASP.NET practically only supports client-side state management. In either case, both frameworks define mechanisms for saving and restoring the state of a control.

In JSF, the state of a control is saved when the JSF application framework calls its saveState(FacesContext) method. This method returns an Object, typically an Object array, of serializable object values. Likewise, when a control is initialized, JSF calls the control's restoreState(FacesContext, Object) method. In this method the control can take the state object array and convert it back into the appropriate property values.

ASP.NET has a more elegant solution for state management, allowing state values to be put into a ViewState map collection and accessed via an associated String key. ASP.NET automatically saves the ViewState map at the end of the request processing lifecycle and serializes it to the client HTML.

XPControl can use the ASP.NET model for saving control state and automatically saves the state of any property set using the setPropertyValue method. This means that for most controls, developers need not worry about implementing the JSF saveState/restoreState methods. However, for situations that require non-property state to be stored, XPControl can provide jumpable wrapper methods, also called saveState and restoreState, that don't depend on a FacesContext argument being passed into the method.

Server-side component frameworks need a way of translating client-side actions (e.g. the clicking of a button, the change in the text of a textfield) into server-side events that can be handled by registered event handling properties. In non-AJAX request processing, form POSTs can contain data indicating that a control should fire an event that should be handled by external methods associated with the control. JSF defines a broadcast (FacesContext) method that fires events that were queued when the HTTP POST request was decoded by the control's renderer class. ASP.NET, having no concept of control renderers, instead defines an interface, IPostBackDataHandler, which performs the functions of decoding the HTTP POST request and firing server side events based on the decoded POSt data, using the LoadPostData and RaisePostDataChangedEvent methods respectively. The XPControl class can use the JSF model for broadcasting server-side events, providing abstracted methods that the IPostBackDataHandler interface will call rather than use the native methods.

In the XPRenderer subclass associated with an XPControl, control developers may decide that a server event needs to be fired based on the data posted back to the server. This POST request decoding occurs in the XPRenderer.UpdateControl method. When implementing this method, if a server-side event needs to be fired, the renderer can call the XPControl's queueControlEvent method. This method will take an instance of IXPControlEvent that will indicate the type of event being fired. Later on, the JSF or ASP.NET application will call the control's broadcastControlEvent method for each server-side event that has been queued. This method can then invoke any event handlers set on the XPControl as needed.

In JSF, this is simply an abstraction of the original event processing code minus the non-jumpable FacesContext argument. ASP.NET can call the XPRenderer.UpdateControl method from within its IPostBackDataHandler.LoadPostData method and will call the broadcastControlEvent method from within the IPostBackDataHandler.RaisePostDataChangedEvent method.

JSF has some platform-specific event types associated with page navigation and input validation. These event types can be addressed in the XPCommand Control and XPInput Control sections below.

Control developers can create custom events by implementing the IXPControlEvent interface.

Both control frameworks possess common methods that can be abstracted in XPControl to allow jumping from JSF to ASP.NET. These functions can be as listed below:

IXPRenderer getControlRenderer—can return an instance of IXPRenderer. A renderer can be a class used to generate the HTML markup used to display an OpenControl. Renderers are native to the JSF framework; however a renderer structure needed to be implemented for ASP.NET.

IXPControl[ ] getChildControls—can return an array of IXPControls, the interface implemented by XPControl, that represent child controls of the current control. These controls can be either jumpable XPControl subclasses or jumpable wrappers around 3rd party controls (see the 3rd Party Control and Renderer Wrappers section of this DSD).

removeChildControl/addChildControl—can add or remove a child control from this control's list of children.

IXPControl getParentControl—can get the control immediately above the current control in the page control hierarchy.

String getAttribute—can get a "pass-through" attribute value for the control. These are non-property attributes set on a control's XML tag that developers may want access to.

IXPControl findControlById—can Locate a control (either OpenControl or 3rd party) in the page control hierarchy by ID.

XPBrowserInfo getBrowserinfo—can get the XPBrowserinfo instance defined for the current HTTP request.

IXPPageContext getPageContext—can get the IXPPageContext instance defined for the current HTTP request.

int getChildCount—can return the number of child controls underneath this control JavaServer Faces separates the functionality between storing control properties and events and rendering and decoding a control to the HTTP response and request respectively. This is a useful design pattern as it allows for multiple renderer's to be associated with a single control, and also allows control developers to customize the display of a 3rd party control simply by registering a new renderer with the control.

ASP.NET does not have such a separation and each WebControl can provide its own rendering functionality, despite this functionality being very similar to the design patterns used by JSF Renderer classes. In essence, an ASP.NET WebControl is an amalgamation of the Control and Renderer.

OpenControls can use the superior separation of control and renderer defined in the JSF web application framework by defining an abstracted XPRenderer class that can serve to render controls in both platforms. In JSF, XPRenderer can extend the existing Renderer class, routing the JSF-specific rendering methods to jumpable abstraction methods. In ASP-.NET, XPRenderer can extend Object and is associated with an XPControl via a custom-built renderer registration system that is borrowed from the JSF implementation.

UI controls are typically declared as XML tags in a JSP or ASP page. As XML tags, they can be structured as a start tag that contains any number of control property mapped attributes, zero or more child controls between the control's XML tags, or static HTML content, and finally an ending XML tag. In addition, control renderer's can have the ability to update the properties of a control by decoding any HTTP POST request targeting the control. The XPRenderer class can have methods supporting these functions.

XPRenderer.UpdateControl can serve as the HTTP POST decoding method. In this method renderers can get request parameter and header values and uses those to set new property values on the XPControl they are associated with. In this method controls can also queue server-side events that will be fired by the control based on request data.

XPRenderer.RenderStart can be called at the start of the rendering of a control. It can typically render content before any of the child controls of the current control are processed. If an XPControl is designed to be a container of child controls, this method can typically render the start tag of an HTML container element, like <div>, <span> or <select>.

XPRenderer.RenderContents can render any child controls programmatically. If a control needs to render child controls in a manner different from how they are laid out in the JSP or ASP, this method can allow developers to access those controls and call the Render methods on IXPRenderer's associated with those controls.

XPRenderer.RenderEnd can close the rendering of a control after all child controls have been processed. In the container example above, such a method implementation might render closing HTML tags like </div>, </span>, or </select>.

In addition, XPRenderer can have some special functionality for determining how to render child controls. If the XPRenderer.getRendersChildren returns true, then the RenderContents method can be invoked and the child controls of the current control must be rendered by the current XPRenderer if they are to be rendered at all. If this method returns false, then the JSP or ASP page can render the child controls directly.

In JSF, Controls and Renderer's are associated via the faces-config.xml file embedded in any control library jar file. Looking up registered Renderer's is performed by the JSF application based on the value of the RendererType property of the control. ASP.NET has no native renderer framework, so OpenControls can implement the JSF renderer registration and lookup framework in ASP. This is done by embedding the OpenControls library XML file in the control DLL. When an XPRenderer is requested by calling the XPControl.GetControlRenderer method, the OpenControls framework can parse the embedded library XML file and dynamically instantiates the appropriate XPRenderer for the control.

The rendering methods of the XPRenderer class can typically pass an instance of the XPControl they are associated with, the current IXPPageContext, and an instance of IXPResponseWriter. IXPResponseWriter can be a standard writer class used to write HTML markup representing the display of the control to the HTTP response.

OpenControls can be packaged with several utility classes that can be used in the XPRenderer to simplify the process of rendering a UI control. These utilities can include:

XPBrowserInfo—can parse the User-Agent header to determine what browser and OS the client making the request is using. Useful in developing browser-independent controls.

IXPPageContext—can encapsulate common HTTP objects such as the request, response, session, and application. Can Provide lightweight access to IDK functions such as determining if an HTTP request is gatewayed and getting the imageserver URI.

XPPostBackRequest—Utility class for generating the JavaScript required to invoke a postback of the form a UI control is in. If XPPostBackRequest detects that it is being used inside of a portlet, it can perform an in-place-refresh postback instead XPRenderTemplate—An HTML resource file embedded in a control jar or dll that can have specialized tokens in the HTML that will be replaced by control property values or XPStringBundle strings.

XPRenderUtility—A Utility class containing static functions for tasks such as escaping HTML or truncating a long section of text.

XPResourceRequest—can generate a resource file URL for serving files embedded in the control library jar or dll over HTTP.

XPStringBundle—A map of internationalized strings, accessible via keys can be loaded from an XML file embedded as a jar or dll resource.

OpenControls can support the use of Accessible renderers for when a portal or application is running in Accessible mode. Control Accessibility can be defined by the 1998 Rehabilitation Act, Section 508, and is also referred to as "508-Mode". In essence, 508 mode user interfaces require minimal to no JavaScript and must be structured in a way that makes them easy to process by a screen reader.

If OpenControls detects that an application is running under Accessible mode, it can look for an appropriate Accessible renderer. By default, it looks for renderer's of with a renderer type string matching the fully qualified class name of the control plus the string "Accessible". Control developers can override the XPControl.getAccessibleRendererType method if they wish to define an Accessible renderer with a different type string.

Accessible renderer's can be developed with the guidelines of Section 508 in mind. Often this will mean decreased functionality for the control or will not be possible for certain classes of highly dynamic controls.

JavaServer Faces defines an ActionSource interface for controls that want to fire ActionEvents. An ActionEvent is an event that typically results in some sort of page navigation, usually according to the strictures of a navigation rule configured in the JSF applications faces-config.xml file. The standard controls that come packaged with JSF include two such ActionSource controls: HtmlCommandButton and HtmlCommandLink. Both these controls are capable of firing ActionEvents and having those events handled by an "Action" event handler property. ASP.NET has no specific structure for performing such page navigations. Since ActionSource controls are so crucial to JSF applications, OpenControls can define a jumpable ActionSource implementor called XPCommand. On the ASP.NET side, the XPCommand class can also include a page navigation framework so that the controls behave similarly in both platforms.

The JSF implementation of XPCommand is very simple in that it replicates the UICommand control that is already part of the JSF specification, only in this case XPCommand can extend XPControl so that it can remain jumpable. The main property of XPCommand is its "Action" event handler property. When the MethodBinding associated with this property is invoked, it can return a navigation result string that can be evaluated by a navigation rule configured in the web application's faces-config.xml file. The JSF application can then navigate to the page URL which results from the rule being applied to the navigation result string.

In the case of ASP.NET, there is no concept of navigation rules. Instead, when the Action event property Delegate is invoked, the returned String of the method will be the URL that the ASP.NET web application navigates to.

The ActionSource interface can also contain addition MethodBindings and the ability to register any number ActionListener event handlers on the control. It can also have an "Immediate" property that determines where in the JSF request processing lifecycle the navigation will take place. This functionality need not be replicated on the ASP.NET version of XPCommand.

In addition to the ActionSource interface, JavaServer Faces can also define an EditableValueHolder interface that can be implemented by controls that can be edited by user input. Typically these controls use or combine one or more HTML form input tags to edit their values. The EditableValueHolder interface also provides event handler properties for validating the data submitted by a form POST before the new value is set on the control implementing the interface. Any control wishing to perform form-based validation can implement EditableValueHolder.

On the ASP.NET side, no interface is required; however controls that wishes to validate editable properties must specify a validation property in the attribute metadata associated with the control. Both JSF and ASP.NET can fire value change events if an editable control has its value changed as the result of a form post.

OpenControls can merge the two methods of performing input control validation with the XPInput class. XPInput can extend XPControl and is a jumpable input and validation base class. The primary property associated with the XPInput class is the "Value" property. Subclasses of XPInput can be able to modify this value when decoding form posts based on user input. In JSF, XPInput can allow a "Validator" event handler property to be assigned to the control. This method can validate the submitted value before it is set on the XPInput control. Finally, the JSF version of XPInput can have a "ValueChangeListener" property that is invoked when the value of the XPInput control is changed due to user input. The ASP.NET version of XPInput can have a "Validate" event handler property instead of the JSF "Validator" property, and a "ValueChange" event handler property instead of the JSF "ValueChangeListener" property, but the function of the two event properties is the same.

The EditableValueHolder interface can also contain an "Immediate" property that determines where in the JSF request processing lifecycle the XPInput validation will take place. This property need not replicated in the ASP.NET version of XPInput.

Both JSF and ASP.NET controls possess the ability to link to external data sources in order to render them. This can consist of the simple binding of a control attribute with a primitive data source property like a String value, or it can consist of more data-driven controls like a Table control that displays the results of a database query. For the former type, the ValueBinding and DataBinding classes and syntax of JSF and ASP.NET are sufficient. For the latter, more complex controls, it is important to provide the proper framework for easily linking OpenControls to external data sources.

Consumers of OpenControls can use data-driven UI controls that can easily link to the data provided by various services, such as portal search queries, content repository document hierarchies, and business processes models. OpenControls can borrow from a new feature in ASP.NET 2.0, and use the XPDataSource control as a base class for a UI control representing an external data source. Combined with an XPDataBound control designed to link with the data source control, these controls can allow the displayed UI to be abstracted from the data it's displaying.

XPDataBound can contain methods for referencing the data source from which it will retrieve the data to be displayed. It can either be explicitly bound to an external data source, or bound to an XPDataSource control using the id of the XPDataSource.

XPDataSource can have an "AdapterType" property containing the fully qualified name of an adapter class that can be defined by the control consumer. This Adapter class can be any class the user wishes, but will typically implement in interface designed to work with the control it is meant to be bound to. For example, a TreeControl can have for its "DataSourceID" property the id of an XPDataSource control on the page. This XPDataSource control would have an "AdapterType" property that would contain the class name of a custom, user-defined class that can implement the ITreeDataSource interface. This interface would be recognizable to the TreeControl, but could be implemented in a number of ways. Data for the TreeControl could come from a database query, an XML file, or any other data source.

Alternately, control developers could extend the XPDataSource control to provide other ways of accessing external data other than dynamically instantiating an adapter class.

OpenControls can support the creation of compound components. This means that a series of UI controls can be able to be nested in a hierarchy to form a larger UI component. Not only must jumpable XPControls be supported, but any arbitrary 3$^{rd}$ party control can be allowed to be included as children of an XPControl. This poses a problem since 3$^{rd}$ party JSF UIComponents and ASP.NET WebControls are likely not jumpable and can break the jumpability of an XPControl subclass if referenced directly.

To solve this problem, OpenControls can provide wrapper classes for 3$^{rd}$ party controls and renderers. The base jumpable control class XPControl can implement a more general IXPControl interface. This interface can also implemented by the XPControlWrapper class. XPControlWrapper can obviously a wrapper around a JSF UIComponent or ASP.NET WebControl instance. It can allow all the jumpable methods in IXPControl to be executed against a 3$^{rd}$ party control, and allows those controls to be referenced within jumpable code. Likewise, the XPRenderer class can implement a more general IXPRenderer interface that is also implemented by an XPRendererWrapper. XPRendererWrapper is a wrapper class around 3$^{rd}$ party JSF Renderer classes and around 3$^{rd}$ party ASP.NET WebControls (since native WebControls don't have any concept of a separate Renderer class).

Methods such as findControl, getParentControl, getChildControls, etc. can return instances of IXPControl. Likewise the IXPControl.getControlRenderer method returns an instance of IXPRenderer. Using these abstracted control and renderer interfaces, control developers can write jumpable code that references any control or control renderer currently in use on the page.

The OpenControls framework can use build system classes and executables to generate JSF configuration files and JSP taglib source files, and convert JSF UIComponents into ASP-.NET WebControls.

In order to create workable UI control libraries in JSF and ASP.NET, the OpenControls build can perform a number of tasks. These tasks can be:
  Generate a faces-config.xml file containing all the controls, control properties, and renderers contained in the opencontrols.jar file.
  Generate both a JSP and facelets tag library descriptor file for using OpenControls in JSP pages and XHTML facelets pages.
  Generate a Tag Library Source file for rendering each control in the library so that they can be declared in a JSP.
  Jump the JSF UIComponent Java source files into C# so that they can be compiled into ASP.NET WebControl classes.
  Compile jumped C# code into an opencontrols.dll file with properly embedded resource files.

The build process of OpenControls, form generating JSF configuration files and tag sources, to jumping UIComponents to WebControls, can revolve around a single configuration file called opencontrols.xml. This file can contain an XML description of each control in the control library, including the class representing the control, the properties and event handlers of the control, the renderers used to display the control, and any design-time information used to display the control in an IDE.

Using this configuration file and an XSL transform engine, configuration and source files can be generated for the controls in the OpenControls library.

When jumping JSF UIComponents into ASP.NET WebControls, this configuration file can be used to determine which getter/setter method pairs are to be converted to C#-style property declarations, as well as what Attribute metadata to insert in source files so that the jumped WebControl will function properly.

The build tools created for OpenControls can be designed to work with a single configuration file that defines all the controls used in a jumpable control library. In one embodiment, control developers need only have to add their control source files and add a control entry to the XML configuration file to generate a jumpable control. The build system and build tools can take care of the rest.

The OpenControls build system can rely on a single XML configuration file. This file can contain data about all the control and renderer classes that make up a library of jumpable UI controls. It can be used in most aspects of the build system to generate the required configuration files and source files necessary to create JSF and ASP.NET control libraries. In one embodiment, this configuration file can contain the following XML elements, designated by their XPath location in the document:

/control-library
The root node of the configuration file.
Child Nodes: <name>, <description>, <control>, <render-kit>

/control-library/name
The name of the control library.
This is the name of the jar or dll
file that encapsulates the
library, minus the file extension.
Child Nodes: Text /control-library/description
A text description of the control library
Child Nodes: Text /control-library/control
A node designating the properties, event handlers, and fields of a jumpable OpenControl
Child Nodes:  <name>, <description>, <type>, <class>, <family>,
  <renderer-type>, <base-tag-class>, <default-property>,
  <default-event>, <validation-property>, <property>,
  <event>

/control-library/control/name
The name of a UI control, as it will appear in the
tag used to declare the control in a JSP, ASP, or
XHTML file.
Child Nodes: text /control-library/control/description
A description of the UI control
Child Nodes: text /control-library/control/type
A type string used by the renderer registration
mechanism to associate a UI control with a
renderer class. Type strings usually follow a
qualilified name similar to the fully qualified class
name of the control
Child Nodes: text /control-library/control/class
The fully qualified name of the class
representing this control. For example,
the SuggestionInput control would list
its class as com.bea.opencontrol.form.SuggestionInput
Child Nodes: text /control-library/control/renderer-type
The default renderer-type used by this control.
Together with the control type and control family
strings, this field determines which renderer will
be used to display the control
Child Nodes: text /control-library/control/family
The broad family of controls to which
a particular control belongs.
Child Nodes: text /control-library/control/base-tag-class
The fully qualified name of the class used as the base tag class for any
tag source file generated for this control. The right base tag to use for
your control is determined by which base class your control class extends.
XPInput subclasses should use the XPInputTag, XPCommand subclasses
should use the XPCommandTag, and so on. If no value is specified,
OpenControls will use XPControlTag as the tag base class. Custom
tag classes may be declared.
Child Nodes:   Text
Values:        com.bea.opencontrols.webapp .XPControlTag,
               com.bea.opencontrols.webapp .XPInputTag,
               com.bea.opencontrols.webapp .XPCommandTag,
               com.bea.opencontrols.webapp .XPDataSourceTag,
               com.bea.opencontrols.webapp .XPDataBoundTag /control-library/control/default-property
The default property of a control. Currently unused but
required for design-time rendering support
Child Nodes: text /control-library/control/default-event
The default event handler property of a control. Currently
unused but required for design-time rendering support
Child Nodes: text /control-library/control/validation-property
Designates a control property that can be validated on the server-side.
Typically this will be a property that can be modified by user input.
Child Nodes: text /control-library/control/property
A property declaration of a control. Control properties are collections
of getter/setter methods (or property declarations in ASP.NET) that
store state about how a UI control is to behave. These properties can
be bound to external data source properties via ValueBinding in JSF and
DataBinding in ASP.NET. All properties have a data type, name, and
can have flags indicating whether they are capable of being bound to
an external data source, as well as whether the properties are required.
Child Nodes:     <name>, <description>, <class>, <bindable>, <required>

/control-library/control/property/name
The name of the property. This name must match the
getPROPERTYNAME( ), setPROPERTYNAME( ) syntax of the
methods used to access this property, as well as the String key
used to store the property using the XPControl.setPropertyValue( )
method. For example, a property named "Text" would have
getText( ) and setText( ) methods for accessing its value, and would
store the property value by calling XPControl.setPropertyValue("Text",
value);
Child Nodes: text /control-library/control/property/description
A description of the property.
Child Nodes: text /control-library/control/property/bindable
Determines whether a property can be bound to an external data source,
such as a ValueBinding in JSF or a data binding in ASP.NET
Child Nodes:     Text
Values:          true or false /control-library/control/property/required
Determines if this control property is required to be set on the tag
representing the control
Child Nodes:     Text
Values:          true or false /control-library/control/property/class
The fully qualified class name (or primitive type) of the object that is
set and retrieved by this control property. Control developers can
create new property types provided that they are jumpable and serializable
Child          Text
Nodes:
Values:        short, int, long, float, double, boolean, char, java.lang.Short,
               java.lang.Integer, java.lang.Float, java.lang.Double,
               java.lang.Boolean, java.lang.Character, java.lang.String,
               java.lang.Object, java.lang.String[ ],
               com.plumtree.openfoundation.util.XPDateTime,
               com.plumtree.openfoundation.util.IXPDictionary, com.plumtree.openfoundation.util.IXPList,
com.plumtree.openfoundation.internationalization.XPLocale /control-library/control/event
An event handler declaration for a control. In JavaServer Faces, event handlers are represented by MethodBinding properties. In ASP.NET, event handlers are specially designated by the delegate and event keywords. In either case, event handler property XML nodes are much like regular property nodes, with the exception that the method signature of the event handler must also be declared in the configuration XML.
Child Nodes:   <name>, <description>, <class>, <bindable>, <required>, <method>

/control-library/control/event/name
The name of the property. This name must match the getEVENTNAME( ), setEVENTNAME( ) syntax of the methods used to access this property, as well as the String key used to store the property using the XPControl.setEventMethod( ) function. For example, an event named "Select" would have getSelect( ) and setSelect( ) methods for accessing its value, and would store the property value by calling XPControl.setEventMethod("Select", binding). When used as tag attributes, event properties are prefixed with an "on" string, as in <MyControl onSelect="binding"/>
Child Nodes:   <name>, <description>, <class>, <bindable>, <required>, <method>

/control-library/control/event/description
A description of the event. This description should include the method signature of the event handler.
Child Nodes: text /control-library/control/event/bindable
Determines whether an event can be bound to an external data method. This node is not required and should always be set to true.
Child Nodes:      Text
Values:           true /control-library/control/event/required
Determines if this control event is required to be set on the tag representing the control
Child Nodes:      Text
Values:           true or false /control-library/control/event/class
This tag is supported but not required. It always contains a value of javax.faces.el.MethodBinding.
Child Nodes:      text
Values:           javax.faces.el.MethodBinding /control-library/control/event/method
Root node for the method signature describing the methods that can be bound to this event property. The method signature consists of an ordered list of arguments the event handler method takes, and a return type for the Object returned by the invocation of the event handler.
Child Nodes: <param>, <return>

/control-library/control/event/method/param
Used to specify the fully qualified class name of an argument to an event handler method, e.g. com.plumtree.openfoundation.util.XPDateTime
Child Nodes: text /control-library/control/event/method/return
Used to specify the fully qualified class name of the return value type of an event handler method, e.g. java.lang.String
Child Nodes: text /control-library/render-kit
A collection of renderer's designed to be used for a particular display environment, e.g. HTML, SVG, etc.
Child Nodes:             <id>, <library>, <renderer>

/control-library/render-kit/id
The ID of the render kit collection. This id represents the type of display environment the renderer's of this render kit are designed for. By default, all render kits have an ID of "HTML_BASIC", which means their renderer's are designed for standard HTML. Other render kits could have IDs like "SVG", "WML", etc.
Child Nodes:             text
Values:                  HTML_BASIC /control-library/render-kit/library
The name of the jar or dll, minus the file extension, where the classes of this render-kit can be found. Used for dynamic instantiation of renderer's. If not specified, the renderer will be searched for in the jar or dll containing the control requesting the renderer.
Child Nodes: text /control-library/render-kit/renderer
Root node for all renderer classes declared in the control library
Child Nodes:     <description>, <family>, <type>, <class>

/control-library/render-kit/renderer/description
A description of the renderer class
Child Nodes: text /control-library/render-kit/renderer/family
The broad family of controls this renderer was designed for
Child Nodes: text /control-library/render-kit/renderer/type
The type name for this renderer. This corresponds to
the /control-library/control/renderer-type
XML node.
Child Nodes: text /control-library/render-kit/renderer/class
The fully qualified class name for this renderer
Child Nodes: text When specifying the properties and events that make up a control in one embodiment, all properties that make up the control can be specified, including properties that are inherited from a super class. For example, if a TextInput control has a Text property, and a TextAreaInput control can extend the TextInput control by adding Rows and Cols properties, the XML description for both controls can look like the following:

```
<control>
    <name>TextInput</name>
    <property>
        <name>Text</name>
        <class>java.lang.String</class>
    </property>
</control>
<control>
    <name>TextAreaInput</name>
    <property>
        <name>Text</name>
        <class>java.lang.String</class>
    </property>
    <property>
        <name>Rows</name>
        <class>int</class>
    </property>
    <property>
        <name>Cols</name>
        <class>int</class>
    </property>
<property>
</control>
```

Exceptions to this rule can be default properties contained in base classes that are part of the OpenControls framework. XPControl can contain several base properties such as RendererType, BackColor, Width, Enabled, etc. Likewise the XPCommand base class can contain a special Action event handler property that does not need to be declared in XML of a control that extends XPCommand. The same holds true for XPInput, XPDataSource, and XPDataBound.

If a control developer creates an abstract base class that will be inherited by concrete control classes, the properties of this abstract class can be declared in the OpenControls configuration XML so that they are jumped properly to C# WebControl classes. The OpenControls J2C build system can be smart enough not to generate taglibrary classes and configuration files for abstract classes.

In one embodiment, because the OpenControls configuration file is an XML file, it is amenable to being transformed by XSL stylesheets into other documents. Since the JSF faces-config.xml and the JSP (and facelets) tag library descriptor files are already in an XML format, this is a relatively simple transformation. The OpenControls J2C extensions can contain executable classes for generating the appropriate configuration files for JSF.

| | |
|---|---|
| Class Name | XSLFacesConfigTransformer |
| Description | Generates the faces-config.xml file for a control library. This configuration file is embedded in the control library jar in the META-INF directory and is automatically read by the JSF application when the library jar is included. |
| Usage | java com.bea.opencontrols.j2c.-XSLFacesConfigTransformer [opencontrols config file] [output file] |

| | |
|---|---|
| Class Name | XSLTagLibTransformer |
| Description | Generates the tag library descriptor file (.tld) used to import custom tags for use in a JSP file |
| Usage | java com.bea.opencontrols.j2c.XSLTagLibTransformer [opencontrols config file] [output file] |

| | |
|---|---|
| Class Name | XSLFaceletsTagLibTransformer |
| Description | Generates the tag library descriptor file (.tld.xml) used to import custom tags for use in a Facelets XHTML files |
| Usage | java com.bea.opencontrols.j2c.XSLFaceletsTagLibTransformer [opencontrols config file] [output file] |

The OpenControls can build script wraps these utilities in custom ANT typedefs that are beyond the scope of this DSD.

The XSL files can be used to generate each of these configuration files is embedded in the opencontrols-j2c.jar generated by the OpenControls Framework build.

One advantage of the OpenControls build system is that it can remove much of the drudgery in creating JSF controls. One annoying task is the creation of JSP tag classes to allow JSF components to be inserted into a JSP page. The OpenControls build again uses the OpenControls configuration file to generate a tag source file for each non-abstract control declared in the configuration file XML. The XSLTagTransformer class can iterate through all the <control> nodes in the configuration file, creating a JSP tag source file for each node that represents a non-abstract control class.

The generated tag sources can all extend a base XPControlTag class that contains methods for converting String tag attributes in to Object control properties. In addition, the XPControlTag can create all the ValueBindings and MethodBindings for JSF controls if the JSF data binding syntax is used in a tag attribute.

Certain OpenControls framework control base classes can require sub-classes of XPControlTag as their base class. These base classes can be specified in the <base-tag-class> node of the <control> XML description. For controls that descend from XPCommand, XPInput, XPDataSource, and XPDataBound, the tag base classes XPCommandTag, XPInputTag, XPDataSourceTag, and XPDataBoundTag can be used respectively.

When a tag source file is generated, the file is created in the same package as the control it wraps, and is named by taking the name of the control class, and appending "Tag".

As with the configuration file transformer classes, the XSL stylesheet used by XSLTagTransformer can be embedded in the opencontrols-j2c.jar file.

| | |
|---|---|
| Class Name | XSLTagTransformer |
| Description | Generates the tag class source files for each non-abstract <control> node in the OpenControls configuration file |
| Usage | java com.bea.opencontrols.j2c.XSLTagTransformer [opencontrols config file] [output directory] |

The OpenControls can build performs a two step process for converting JSF control and renderer source files into ASP.NET C# source for the corresponding WebControl classes. The first step is to process the JAVA files using the J2C source conversion tool, using a custom BuilderRuleSet to properly convert all the imports, methods, and fields into C#imports, methods, properties, and fields.

The OpenControls framework can provide a custom implementation of the J2C BuilderRuleSet class called OpenControlsBuilderRuleSet. This class can parse the OpenControls configuration file into an Object representation that is used to determine how to transform the source files. The parsed objects can consist of:

ControlLibraryInfo—An object representation of the entire library. This class can contain all the base framework JAVA→C# method mappings, the JAVA method→C# property mappings, import mappings, and type mappings that apply to each OpenControl ControlInfo—A set of objects representing all the controls in the control library. It can contain getter/setter methods for control fields like RendererType and control Type and Family. It also can contain lists of all the properties and events contained by this control.

PropertyInfo—A representation of all the information about a particular property of a control EventInfo—A representation of all the information about a particular event handler property of a control RenderKitInfo—An object representation of a RenderKit. This object contains a list of renderers contained in this RenderKit.

RendererInfo—Can contain all the relevant information for each renderer in a library As the builder rule set processes each source file, it can check by class name to see if the current source file has a ControlInfo object representing it. If so, this control info object can be used to properly jump custom properties and events associated with the control in the control and render source. JAVA getter/setter method references can be converted to C# property references.

Once the new C# source files have been generated, they can be further processed by an OpenControlsPostFilter class. This utility class iterates over all the source files in a directory, checking to see if the source file has a corresponding ControlInfo or RendererInfo class created by parsing the OpenControls configuration XML file.

If a ControlInfo class is located by class name, it can be used to determine which pairs of Java getter/setter methods represent control properties, and convert the getter/setter method signatures into C# property declarations. In one embodiment, getter/setter methods are written one after the other in Java source files. In one embodiment, for control properties to be correctly jumped, the getter method precedes the setter method, and has no intervening code inserted between the two methods.

When properly formatted, the Text and Rows properties can be jumped to the following C# property declarations:

```
public virtual String Text
{
  get
  {
    return (String) GetPropertyValue("Text");
  }
  set
  {
    SetPropertyValue("Text", value);
  }
}
public virtual int Rows
{
  get
  {
    return GetIntPropertyValue("Rows");
  }
  set
  {
    SetIntPropertyValue("Rows", value);
  }
}
```

Event handler property processing can be similar, with the two exceptions that event properties have a Delegate declaration, the use of the event keyword, and an add/remove property syntax. The Java MethodBinding property declaration:

```
public MethodBinding getActivate( )
{
  return getEventMethod("Activate");
}
public void setActivate(MethodBinding eventMethod)
{
  setEventMethod("Activate", eventMethod);
}
```

Will can be converted to the following C# code if an EventInfo object is found matching the event property name:

```
public delegate void ActivateHandler(ActiveButton arg0);
public virtual event ActivateHandler Activate
{
  add
  {
    AddEventMethod("Activate", value);
  }
  remove
  {
    RemoveEventMethod("Activate", value);
  }
}
```

Note that the delegate declaration ActivateHandler resembles a method declaration. The OpenControlsPostFilter can take the event handler method signature, defined in the OpenControls configuration file and parsed into an EventInfo instance, and use it to generate the arguments that are appropriate for the event delegate. Event property delegates can be named [Event Name] Handler.

In addition, the post filter can convert the getEventMethod and setEventMethod functions to event property appropriate AddEventmethod and RemoveEventMethod functions respectively. This change can ensure that multiple delegate functions can be assigned to a single event property.

ASP.NET WebControls make heavy use of a C# feature not available to Java code: class, method, and property attribute metadata. C# metadata attributes use a special syntax and are added to a source file above the class, method, or property declaration they modify. ASP.NET functionality such as control validation, design-time rendering, data binding, and data type conversion are all mediated using C# metadata attributes.

By placing all the metadata for a control, its properties and events in the OpenControls configuration file, the OpenControlsPostFilter can access that metadata and insert it as C# attribute declarations before the appropriate class, method or property declaration. In the example above, the metadata associated with the Activate event handler would look something like this:

```
public delegate void ActivateHandler(ActiveButton arg0);
[Bindable(true)]
[Category("Behavior")]
[Description("An AJAX event when the user clicks the button")]
public virtual event ActivateHandler Activate
{
  add
  {
    AddEventMethod("Activate", value);
  }
  remove
  {
    RemoveEventMethod("Activate", value);
  }
}
```

Control Library Binary Utilities

To simplify the process of creating a binary jar or dll containing the compiled control and renderer classes, OpenControls can provide custom Ant tasks that can be included in the control build script. Creating a Java jar file is relatively simple; all the files in the jar can be placed in a directory structure and the entire directory is zipped up into a jar file by the Ant <jar> task.

.NET DLL generation is more complicated in that it relies on the C# compiler to create the assembly file. In addition, each resource file contained in the assembly file must be individually mapped to a resource file key in the compiler execution string. Since OpenControls DLLs can make use of many embedded resource files, the custom BuildDllTask, DotnetResourceSet, and the WebResourceAppender custom ant tasks and nodes are used to generate control library DLLs and embed resources in the control library.

The DotnetResourceSet can be pointed to a root directory of ASP.NET resource files. From that directory, it can add every file in the directory to the compiled DLL as a resource. The key for each resource added to the DLL is the path to that resource file, relative to the root of the resource directory. This is useful since in the OpenControls framework, resource files are all reference by path.

An example of how to use the BuildDllTask and the DotnetResourceSet is shown below:

```
<build-dll executable="${csharp.home}\csc.exe"
           extraoptions="/checked+"
           debug="on"
           optimize="true"
           targettype="library"
           outputfile="${cust.bin.dir}\${binary.controls.name}.dll"
           references="${project.buildpath}"
           srcdir="${build.controls.dotnet.src.dir}">
    <resourceset dir="${build.controls.dotnet.resources.dir}"/>
    <resource file="${controls.conf.dir}\opencontrols.xml"
       name="com.bea.opencontrols.-
       CONTROL_LIBRARY_CONFIG"/>
</build-dll>
```

In order to make DLL resource files available to be served via HTTP, they can be added as attribute declarations to the AssemblyInfo.cs file associated with a DLL assembly. The WebResourceAppender class takes the root directory of the resource files to be embedded in the DLL and the AssemblyInfo.cs file to be included in the DLL, and appends resource file attributes so that all the resources included in the control library DLL may be served via HTTP using the new ASP.NET 2.0 WebResource feature. An example of using this task and the resulting AssemblyInfo.cs file are below:

```
<webResourceAppender file="${build..dotnet.src.dir}\AssemblyInfo.cs"
       dir="${build.controls.dotnet.resources.dir}"/>
AssemblyInfo.cs
using System;
using System.Reflection;
using System.Runtime.CompilerServices;
// Set the CompanyName, Copyright and Trademark fields
[assembly: AssemblyCompany("BEA Systems")]
[assembly: AssemblyCopyright("Copyright (c) 2005 BEA Systems")]
[assembly: AssemblyTrademark("opencontrols is a trademark of BEA Systems")]
// Set the ProductName and ProductVersion fields.
[assembly: AssemblyProduct("opencontrols")]
[assembly: AssemblyInformationalVersion("1.0.0.0")]
// Set the FileVersion, AssemblyVersion, FileDescription and Title fields
[assembly: AssemblyFileVersion("1.0.0.0")]
// Version information for an assembly consists of the following four values:
// Major Version.Minor Version.Build Number.Revision (e.g. 1.0.0.0)
[assembly: AssemblyVersion("1.0.0.0")]
[assembly: AssemblyTitle("opencontrols")]
[assembly: AssemblyDescription("opencontrols")]
// Set the assembly culture
[assembly: AssemblyCulture("")]
// Web Resource Declarations
[assembly: System.Web.UI.WebResource    /private/opencontrols/css/opencontrols.css",
"text/css")]
```

-continued

| | |
|---|---|
| [assembly: System.Web.UI.WebResource | /private/opencontrols/css/opencontrols8.css", "text/css")] |
| [assembly: System.Web.UI.WebResource | /private/opencontrols/css/opencontrols9.css", "text/css")] |
| [assembly: System.Web.UI.WebResource /private/opencontrols/img/form/btn_basic_disabled.gif", "image/gif")] | |
| [assembly: System.Web.UI.WebResource /private/opencontrols/img/form/btn_basic_down.gif", "image/gif")] | |
| [assembly: System.Web.UI.WebResource /private/opencontrols/img/form/btn_basic_over.gif", "image/gif")] | |

The appendix shows exemplary J2C classes for converting Java to C or C# code.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method comprising:
    extending, by a computer system, a control base class to produce a Java Server Face (JSF) user interface control, the control base class including abstracted control functionality common to JSF and ASP.NET, the abstracted control functionality comprising one or more of: unique ID generation, tag-defined properties, tag-defined event handlers, control state management, or event broadcast;
    wherein the control base class includes one or more method signatures that are convertible to an ASP.NET version of the control base class;
    and converting, by the computer system, the JSF user interface control extended from the control base class into an ASP.NET user interface control.

2. The method of claim 1, wherein an abstracted renderer class is used to provide rendering functionality in both JSF and ASP.NET.

3. The method of claim 2, wherein the abstracted renderer class is extended to produce a specific JSF renderer.

4. The method of claim 1, wherein a page command control for page navigation is convertible between JSF and ASP.NET.

5. The method of claim 1, wherein an abstract input control is convertible from JSF to ASP.NET.

6. The method of claim 1, wherein third party control and readers can use a wrapper that allows references by a convertible control.

7. A non-transitory computer readable medium having stored thereon code executable by a processor, the code comprising:

code that causes the processor to extend a control base class to produce a Java Server Face (JSF) user interface control, the control base class including abstracted control functionality common to JSF and ASP.NET, the abstracted control functionality comprising one or more of: unique ID generation, tag-defined properties, tag-defined event handlers, control state management, or event broadcast;

wherein the control base class includes one or more method signatures that are convertible to an ASP.NET version of the control base class;

and code that causes the processor to convert the JSF user interface control extended from the control base class into an ASP.NET user interface control.

8. The non-transitory computer readable medium of claim 7, wherein an abstracted renderer class is used to provide rendering functionality in both JSF and ASP.NET.

9. The non-transitory computer readable medium of claim 8, wherein the abstracted renderer class is extended to produce a JSF specific renderer.

10. The non-transitory computer readable medium of claim 7, wherein a page command control for page navigation is convertible between JSF and ASP.NET.

11. The non-transitory computer readable medium of claim 7, wherein an abstract input control is convertible from JSF to ASP.NET.

12. The non-transitory computer readable medium of claim 7, wherein third party control and readers can use a wrapper that allows references by a convertible control.

13. A computer system comprising:
a processor configured to:
extend a control base class to produce a Java Server Face (JSF) user interface control, the control base class including abstracted control functionality common to JSF and ASP.NET, the abstracted control functionality comprising one or more of: unique ID generation, tag-defined properties, tag-defined event handlers, control state management, or event broadcast;

wherein the control base class includes one or more method signatures that are convertible to an ASP.NET version of the control base class;

and convert the JSF user interface control extended from the control base class into an ASP.NET user interface control.

\* \* \* \* \*

UNITED STATES PATENT AND TRADEMARK OFFICE
CERTIFICATE OF CORRECTION

PATENT NO. : 8,601,447 B2  
APPLICATION NO. : 11/863811  
DATED : December 3, 2013  
INVENTOR(S) : Browne et al.

It is certified that error appears in the above-identified patent and that said Letters Patent is hereby corrected as shown below:

In the Specification

In column 1, line 29, delete "JAVA" and insert -- Java --, therefor.

In column 1, line 30, delete "JAVA" and insert -- Java --, therefor.

In column 1, line 33, delete "JAVA" and insert -- Java --, therefor.

In column 1, line 50, delete "JAVA" and insert -- Java --, therefor.

In column 1, line 51, delete "JAVA" and insert -- Java --, therefor.

In column 2, line 2, delete "JAVA-language" and insert -- Java-language --, therefor.

In column 2, line 48, delete "JAVA" and insert -- Java --, therefor.

In column 2, line 51, delete "JAVA" and insert -- Java --, therefor.

In column 2, line 52, delete "JAVA" and insert -- Java --, therefor.

In column 4, line 40, delete "mycontroL.value" and insert -- mycontrol.value --, therefor.

In column 5, line 6, delete "implementor." and insert -- implementer. --, therefor.

In column 5, line 67, delete "JAVA," and insert -- Java, --, therefor.

In column 6, line 51, delete "Boolean" and insert -- boolean --, therefor.

In column 6, line 55, delete "JAVA" and insert -- Java --, therefor.

In column 10, line 19, delete "POSt" and insert -- POST --, therefor.

In column 11, line 21, delete "control" and insert -- control. --, therefor.

Signed and Sealed this  
Third Day of June, 2014

Michelle K. Lee  
*Deputy Director of the United States Patent and Trademark Office*

CERTIFICATE OF CORRECTION (continued)
U.S. Pat. No. 8,601,447 B2

In column 12, line 49, delete "instead" and insert -- instead. --, therefor.

In column 13, line 28, delete "implementor" and insert -- implementer --, therefor.

In column 14, line 36, delete "UT" and insert -- UI --, therefor.

In column 23, line 16, delete "JAVA" and insert -- Java --, therefor.

In column 23, line 19, delete "C#imports," and insert -- C# imports, --, therefor.

In column 23, line 29, delete "JAVA" and insert -- Java --, therefor.

In column 23, line 29, delete "JAVA" and insert -- Java --, therefor.

In column 23, line 50, delete "render" and insert -- renderer --, therefor.

In column 23, line 51, delete "JAVA" and insert -- Java --, therefor.